(12) United States Patent
Bhandari et al.

(10) Patent No.: US 10,572,292 B2
(45) Date of Patent: Feb. 25, 2020

(54) PLATFORM INDEPENDENT GPU PROFILES FOR MORE EFFICIENT UTILIZATION OF GPU RESOURCES

(71) Applicant: VMWARE, INC., Palo Alto, CA (US)

(72) Inventors: Akshay Bhandari, Bangalore (IN); Muralidhara Gupta, Bangalore (IN); Nidhin Urmese, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 155 days.

(21) Appl. No.: 15/817,310

(22) Filed: Nov. 20, 2017

(65) Prior Publication Data

US 2019/0102212 A1    Apr. 4, 2019

(30) Foreign Application Priority Data

Oct. 3, 2017 (IN) .............................. 201741035037

(51) Int. Cl.
| | |
|---|---|
| *G06F 9/455* | (2018.01) |
| *G06T 1/20* | (2006.01) |
| *G06F 9/50* | (2006.01) |
| *G06F 9/38* | (2018.01) |
| *G06F 9/445* | (2018.01) |

(52) U.S. Cl.
CPC ........ *G06F 9/45558* (2013.01); *G06F 9/3877* (2013.01); *G06F 9/455* (2013.01); *G06F 9/5044* (2013.01); *G06F 9/5077* (2013.01); *G06T 1/20* (2013.01); *G06F 9/44505* (2013.01); *G06F 2009/4557* (2013.01)

(58) Field of Classification Search
None
See application file for complete search history.

(56) References Cited

U.S. PATENT DOCUMENTS

2016/0057074 A1*  2/2016  Jacobs ................... H04L 47/74
                                          709/226
2018/0204301 A1*  7/2018  Featonby ................. G06T 1/20

* cited by examiner

*Primary Examiner* — Qing Yuan Wu
(74) *Attorney, Agent, or Firm* — Thomas | Horstemeyer, LLP

(57) ABSTRACT

Disclosed are various examples for platform independent graphics processing unit (GPU) profiles for more efficient utilizes of GPU resources. A computing device can identify a platform independent configuration of a virtual machine, such as one made by an administrator, that indicates that a virtual graphics processing unit (vGPU) is to be utilized in execution, where the configuration comprising a graphics computing requirement for the virtual machine. The computing device can identify one or more hosts available in a computing environment to place the virtual machine, where each of the plurality of hosts comprises at least one GPU. The computing device can identify a most suitable one of the hosts to place the virtual machine based at least in part on the graphics computing requirement and whether a preferred graphics card was specified.

20 Claims, 12 Drawing Sheets

PLATFORM INDEPENDENT GPU PROFILES FOR MORE EFFICIENT UTILIZATION OF GPU RESOURCES

BACKGROUND

Computer virtualization relates to the creation of a virtualized version of a generally physical device, such as a server, a storage device, a central processing unit (CPU), a graphics processing unit (GPU), or other computing resources. A virtual machine (VM) is an emulation of a computer system and can be customized to include, for example, a predefined amount of random access memory (RAM), a predefined amount of hard drive storage space, an operating system, as well as other computing resources. Virtual machines resemble physical computer architectures and provide functionality of a physical computer. Virtual machines can be executed remotely traditionally in a data center, for example, to provide remote desktop computer sessions for employees of an enterprise. Thus, virtual machines can further utilize graphics processing resources of a data center to provide remote desktop computer sessions and other virtualized computer applications. Virtualization of various aspects of physical devices in a data center can ensure redundancy and provide an efficient distribution of computing resources.

NVIDIA® GRID is an advanced technology for sharing virtual GPUs (vGPUs) across multiple virtual desktop and application instances. Virtual machines can be assigned to respective vGPUs to perform graphics processing, for instance, to provide virtualized computer applications to an end user. To do so, an administrator can specify a profile for a virtual machine that causes the virtual machine to be assigned to a host having a corresponding type of NVIDIA® graphics card. An administrator of an enterprise can assign a desired amount of graphics processing resources by creating a customized graphics profile for each employee of the enterprise. Each virtual desktop executing in a data center can have dedicated graphics memory. In some situations, NVIDIA® GRID™ permits up to sixteen users to share a single physical GPU in a data center. However, assignment of graphics profiles to physical GPUs remains problematic as does migrating a virtual machine from a host having one type of graphics card to another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
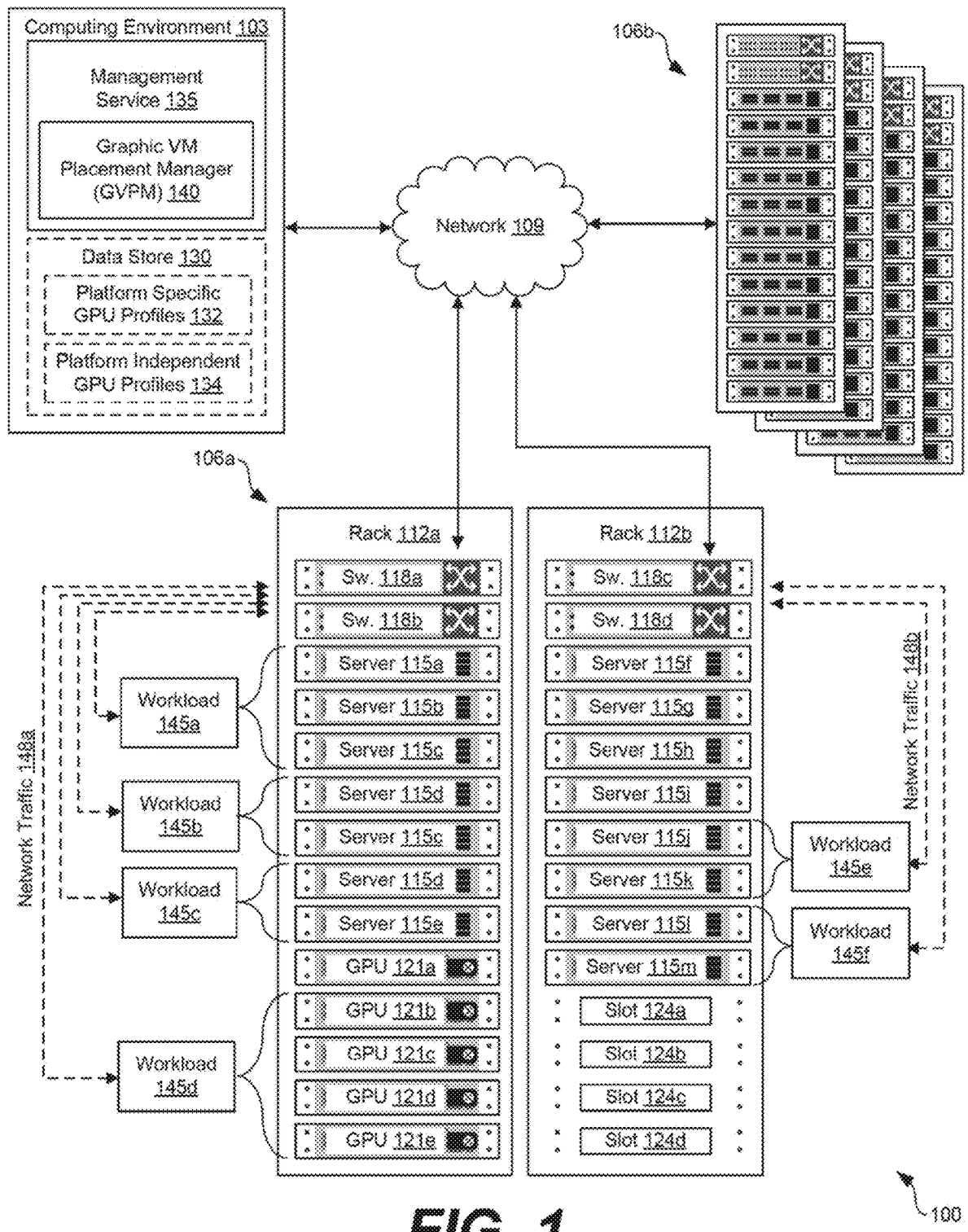
FIG. 1 is a drawing of an example of a networked environment having computing systems that provide a virtualization infrastructure.

The present disclosure relates to graphics processing unit (GPU) profiles for more efficient utilization of graphics processing unit (GPU) resources. In various cloud-based or on premise computing environments, configuring virtual machines (VMs) with NVIDIA® GRID virtual graphics processing units (vGPUs) leads to an inefficient utilization of GPU resources. Additional overhead is created as administrators are required to manually configure each virtual machine based on graphics capabilities of a host. This results in higher operational costs for maintaining a data center and requires manual effort for creating and maintaining virtual machines configured with vGPUs.

For instance, an administrator is required to configure a virtual machine with a platform specific vGPU profile in order to use GPU resources offered through the NVIDIA® GRID platform. As a result, a virtual machine is bound to a graphics profile rather than the graphics requirements of the virtual machine. As the vGPU profile specified for a machine is platform specific, the virtual machine cannot be migrated to another platform. For instance, a virtual machine bound to a GPU profile for an NVIDIA® or TESLA® graphics card cannot be migrated to a host having a graphics card manufactured by a different entity as the GPU profile would be incompatible. As can be appreciated, movement of a virtual machine in a computing environment is thus impaired, especially in a computing environment formed of hosts having different makes and models of graphics cards and GPUs. Moreover, as a virtual machine configured with a vGPU profile utilizes a shared peripheral component interconnect (PCI) pass-through mechanism, many features of a dynamic resource scheduler (DRS), such as a VMware® DRS, are unavailable to these virtual machines, which makes the initial placement of these virtual machines crucial to provide an efficient allocation of resources.

Accordingly, various examples are described herein to achieve an optimal utilization of GPU resources in a cluster potentially consisting of heterogeneous graphics cards or, in other words, a cluster consisting of graphics cards (and GPUs) of different makes and models. In one example, a graphic processing unit virtual machine placement manager (GVPM) can be executed in at least one computing device, such as a server. The GVPM can generate platform independent configurations of a virtual machine, such as those made by administrators, that indicate that a vGPU is to be utilized in execution of the virtual machines. Instead of the configuration of a virtual machine merely including a vGPU profile for a particular make of graphics cards, the configuration can include an actual graphics computing requirement for the virtual machine. The GVPM can identify one or more hosts available in a computing environment to place the virtual machine, where each of the plurality of hosts comprises at least one GPU. The computing device can further identify a most suitable one of the hosts to place the virtual machine based at least in part on the graphics computing requirement specified in a configuration of the virtual machine and whether the configuration specifies a preferred graphics card.

With reference to FIG. 1, an example of a networked environment 100 is shown. The networked environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

In various embodiments, the computing systems 106 can include a plurality of devices installed in racks 112 which can make up a server bank, computing cluster, or a computer bank in a data center or other like facility. The devices in the computing systems 106 can include any number of physical machines, virtual machines, and software, such as operating systems, drivers, and computer applications. In some examples, a computing environment 103 can include an enterprise computing environment that includes hundreds or even thousands of physical machines, virtual machines, and other software implemented in devices stored in racks 112 distributed geographically and connected to one another through the network 109. It is understood that any virtual machine is implemented using at least one physical device.

The devices in the racks 112 can include, for example, memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, each server 115 in the networked environment 100 can include a hypervisor. In some examples, a hypervisor can be installed on a server 115 to support a virtual machine execution space within which one or more virtual machines can be concurrently instantiated and executed. In some examples, the hypervisor can include VMware ESX™ hypervisor or a VMware ESXi™ hypervisor. It is understood that the computing systems 106 are scalable, meaning that the computing systems 106 in the networked environment 100 can be scaled dynamically to include additional servers 115, switches 118, GPUs 121, and other components, without degrading performance of the virtualization environment.

Similarly, the computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 the computing systems 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing systems 106. In some examples, the computing environment 103 can include one or more top-of-rack (TOR) devices.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, such as structure query language (SQL) databases, non-SQL databases, or other relational databases. The data stored in the data store 130, for example, can be associated with the operation of the various services or functional entities described below.

The data store 130 can include a database or other memory that includes, for example, platform specific GPU profiles 132, platform independent GPU profiles 134, as well as other data. Platform specific GPU profiles 132 can include, for example, GPU profiles that bind a virtual machine to a particular make or model of graphics card. Examples of platform specific GPU profiles 132 are listed below:

TABLE 1

Profiles for Associated Graphics Cards

| Profile | Graphics Card | Frame Buffer Memory | Number of Virtual Machines Per GPU |
| --- | --- | --- | --- |
| K120Q | NVIDIA ® K1 | 512 MB | 8 |
| K140Q | NVIDIA ® K1 | 1 GB | 4 |
| K160Q | NVIDIA ® K1 | 2 GB | 2 |
| K180Q | NVIDIA ® K1 | 4 GB | 1 |
| K220Q | NVIDIA ® K2 | 512 MB | 8 |
| K240Q | NVIDIA ® K2 | 1 GB | 4 |
| K260Q | NVIDIA ® K2 | 2 GB | 4 |
| GRID M10-0q | NVIDIA ® M10 | 512 MB | 16 |
| GRID M10-2q | NVIDIA ® M10 | 2 GB | 4 |
| GRID M10-4q | NVIDIA ® M10 | 4 GB | 2 |
| GRID M60-0q | NVIDIA ® M60 | 512 MB | 18 |
| GRID M60-2q | NVIDIA ® M60 | 2 GB | 4 |
| GRID M60-4q | NVIDIA ® M60 | 4 GB | 2 |
| GRID M60-8q | NVIDIA ® M60 | 8 GB | 1 |

Conversely, platform independent GPU profiles 134 can include profiles not specific to a particular make, model, manufacturer, version, or type of graphics card. Rather, platform independent GPU profiles 134 can include graphics resource requirements customizable by an administrator for a virtual machine. In some examples, the management service 135 can generate a platform independent GPU profile 134 for one or more virtual machines using computing specifications provided by an administrator. To this end, a platform independent GPU profile 134 can include a video memory requirement, a central processing unit (CPU) requirement, a random-access memory (RAM) requirement, a preferred graphics card, or other requirement for a virtual machine.

The components executed on the computing environment 103 can include, for example, a management service 135 as well as other applications, services, processes, systems, engines, or functionality not discussed in detail herein. In examples in which the computing systems 106 implement a hyper-converged computing environment, the management service 135 can include a hyper-converged management service. The management service 135 can be executed to oversee the operation of the networked environment 100 through management of the computing systems 106 as well as the devices and software that make up the computing systems 106. In some examples, an enterprise, organization, or other entity, can operate the management service 135 to oversee or manage the operation of devices in the racks 112, such as servers 115, switches 118, GPUs 121, power supplies, cooling systems, or other components.

In some examples, the management service 135 can include a GVPM 140. The GVPM 140 can oversee assignment of graphics processing resources for various components of the racks 112. For instance, the GVPM 140 can assign virtual machines that require graphics processing resources to one or more hosts based on a configuration of the virtual machine. In some examples, the GVPM 140 can assign virtual machines to graphics processing resources on a best-fit mode of assignment or a first-first mode of assignment, as will be discussed.

Further, various physical and virtual components of the computing systems 106 can process workloads 145a . . . 145f. Workloads 145 can refer to the amount of processing that a server 115, switch 118, GPU 121, or other physical or virtual component has been instructed to process or route at a given time. The workloads 145 can be associated with applications executing on the servers 115. For instance, the workloads 145 can include tasks to be processed to provide employees of an enterprise with remote desktop sessions or other virtualized computing sessions. The management service 135 can maintain a listing of active or inactive workloads 145 as well as oversee the assignment of various workloads 145 to various devices in the computing systems 106. For instance, the management service 135 can assign a workload 145 lacking in available resources to a server 115 that has resources sufficient to handle the workload 145. The workloads 145 can be routed to various servers 115 by the switches 118 as network traffic 148a . . . 148b.

The management service 135 can also determine benchmarks to evaluate performance of servers 115, switches 118, GPUs 121, and other components in the racks 112. To this end, the management service 135 can determine or generate metrics describing how easily a server 115 processes a workload 145 or how quickly a switch 118 routes network traffic 136, which in turn can be divided into response time reflecting the time between a user request and a response to the request from the computing system 106 as well as throughput reflecting how much work is performed over a given time frame. The management service 135 can also generate performance metrics describing how well components of the racks 112 are processing workloads 145.

Figure 2:
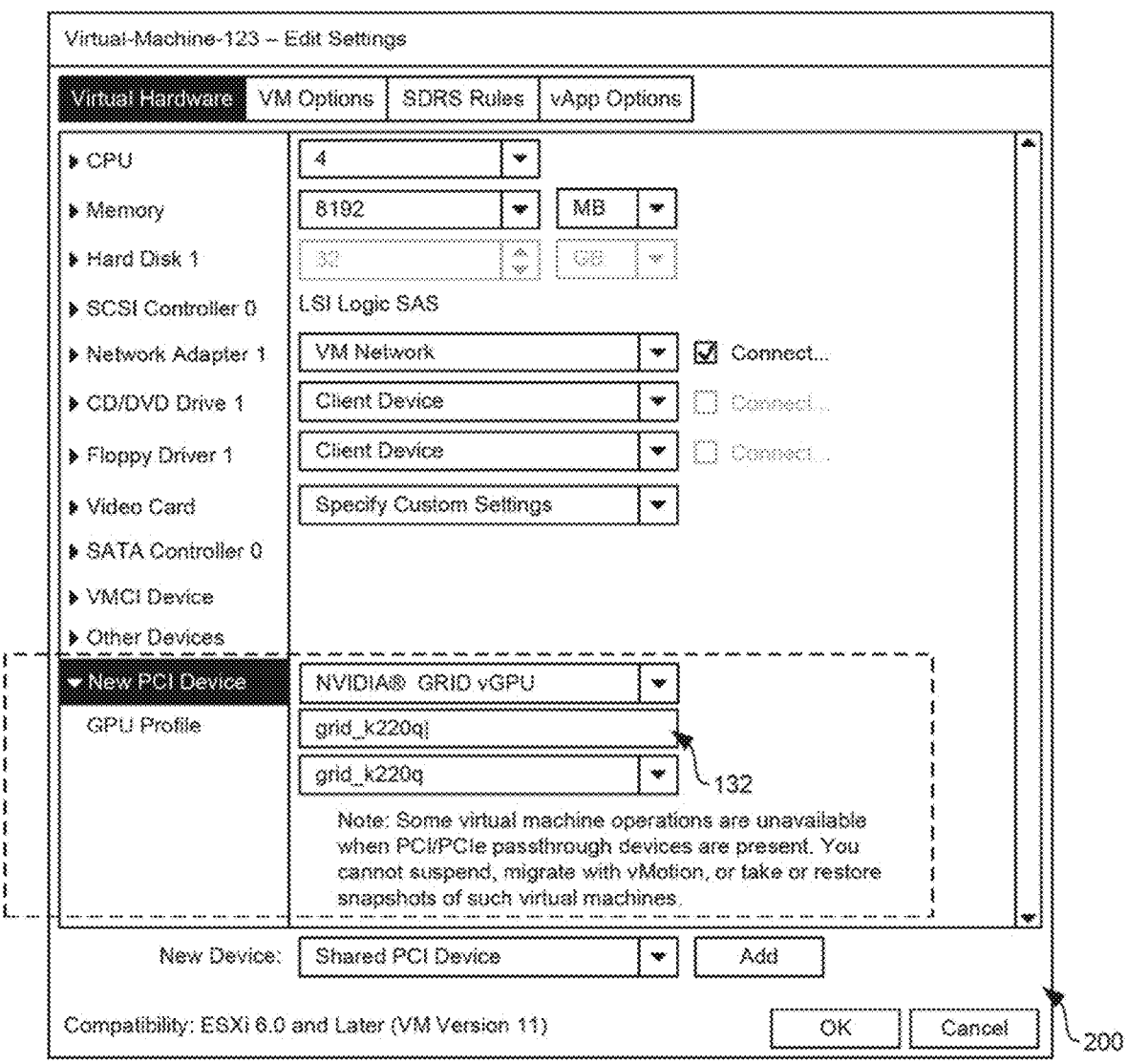
FIG. 2 is a drawing of an example of a user interface for configuring a virtual machine using a platform specific GPU profile.

Referring next to FIG. 2, an example of a user interface 200 for configuring a virtual machine is shown according to various examples. An administrator can interact with fields of the user interface 200 of FIG. 2, or similar user interface 200, to configure a virtual machine. For instance, the administrator can specify CPU requirements, memory requirements, or other settings for a virtual machine which, if the resources are available in a host in a computing system 106, will be assigned to the host for execution. Some virtual machines can provide an end user with a desktop session and can execute applications remotely that can be processing intensive, such as computer-aided design and drafting (CAD) software, photo editing software, video rendering software, video games, or other applications. Thus, an administrator may desire to assign the virtual machine to a host having suitable graphics processing capabilities.

To this end, an administrator can specify a platform specific GPU profile 132. For instance, if an administrator specifies the K220Q profile, as shown in FIG. 2, the virtual machine will be assigned to a host having the NVIDIA® K2 graphics card installed thereon, as can be determined from Table 1. However, the computing systems 106 can include a limited number of hosts that have a NVIDIA® K2 graphics card or other applicable graphics card installed thereon and migration of the virtual machine is thus impaired. In addition, various virtual machine operations traditionally available in a virtualization environment become unavailable. For instance, when PCI or PCI/e pass-through devices are present in a configuration of a virtual machine, a virtual machine is bound to a physical device (such as a graphics card, GPU 121, or other physical device). Thus, the virtual machine cannot be suspended or migrated with vMotion by VMWare® or similar applications. Additionally, snapshots of a virtual machine cannot be taken or restored.

Figure 3:
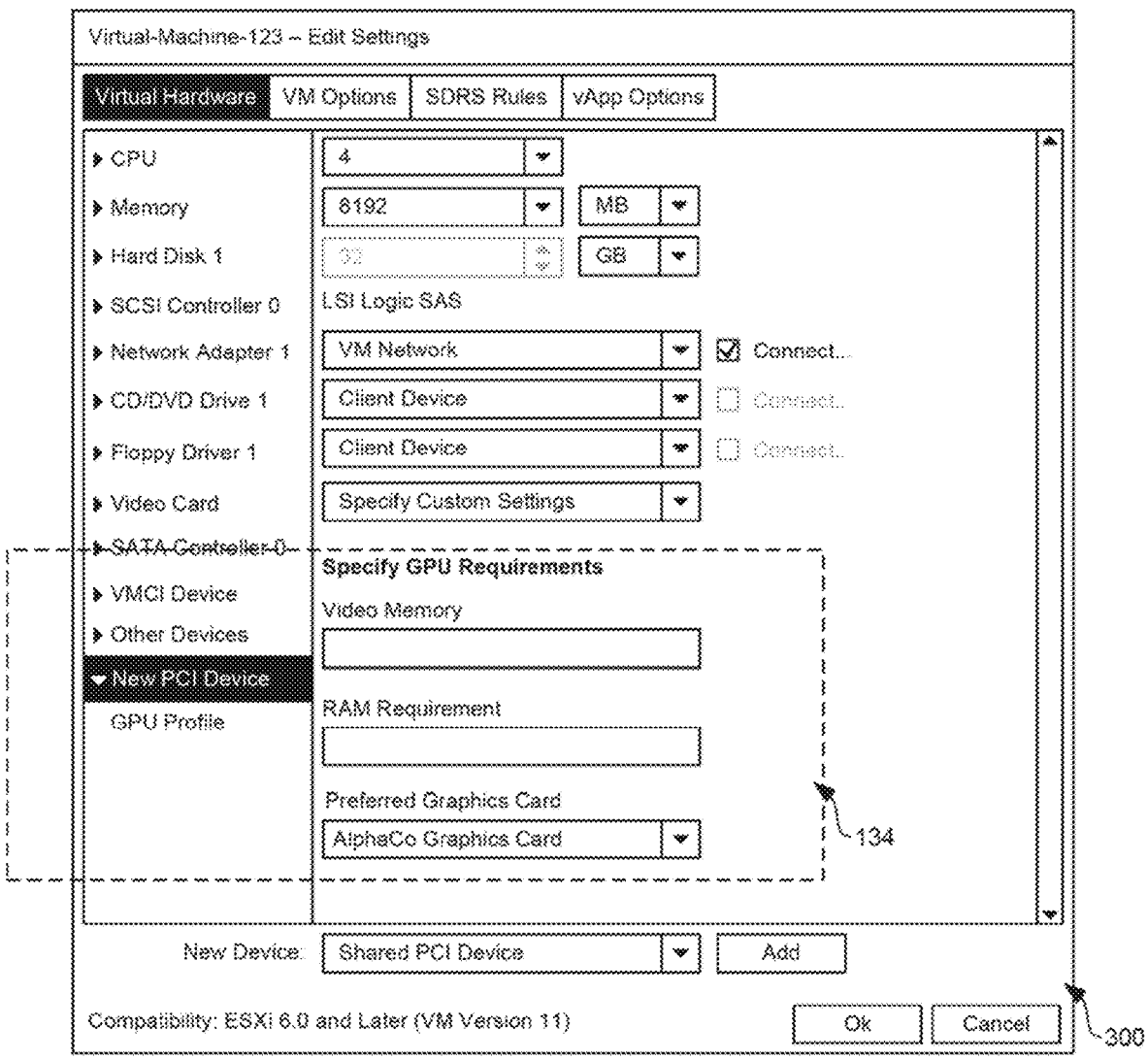
FIG. 3 is a drawing of an example of a user interface for configuring a virtual machine using a platform independent GPU profile.

Moving on to FIG. 3, another example of a user interface 300 for configuring a virtual machine is shown according to various examples. Although an administrator may desire to assign the virtual machine to a host having decent graphics processing capabilities, the administrator may not desire to bind the virtual machine to a specific graphics card as doing so creates an inefficient utilization of GPU resources. Instead of specifying a platform specific GPU profile 132, it can be beneficial to specify specific requirements for the virtual machine that can be used to generate a platform independent GPU profile 134. In some examples, a platform independent GPU profile 134 can include a video memory requirement, a CPU requirement, a RAM requirement, a preferred graphics card, or other requirement for a virtual machine. Accordingly, the GVPM 140 can assign the virtual machine to a host based on the required graphics computing requirements for the virtual machine instead of binding the virtual machine to a particular make or model of graphics card.

Figure 4:
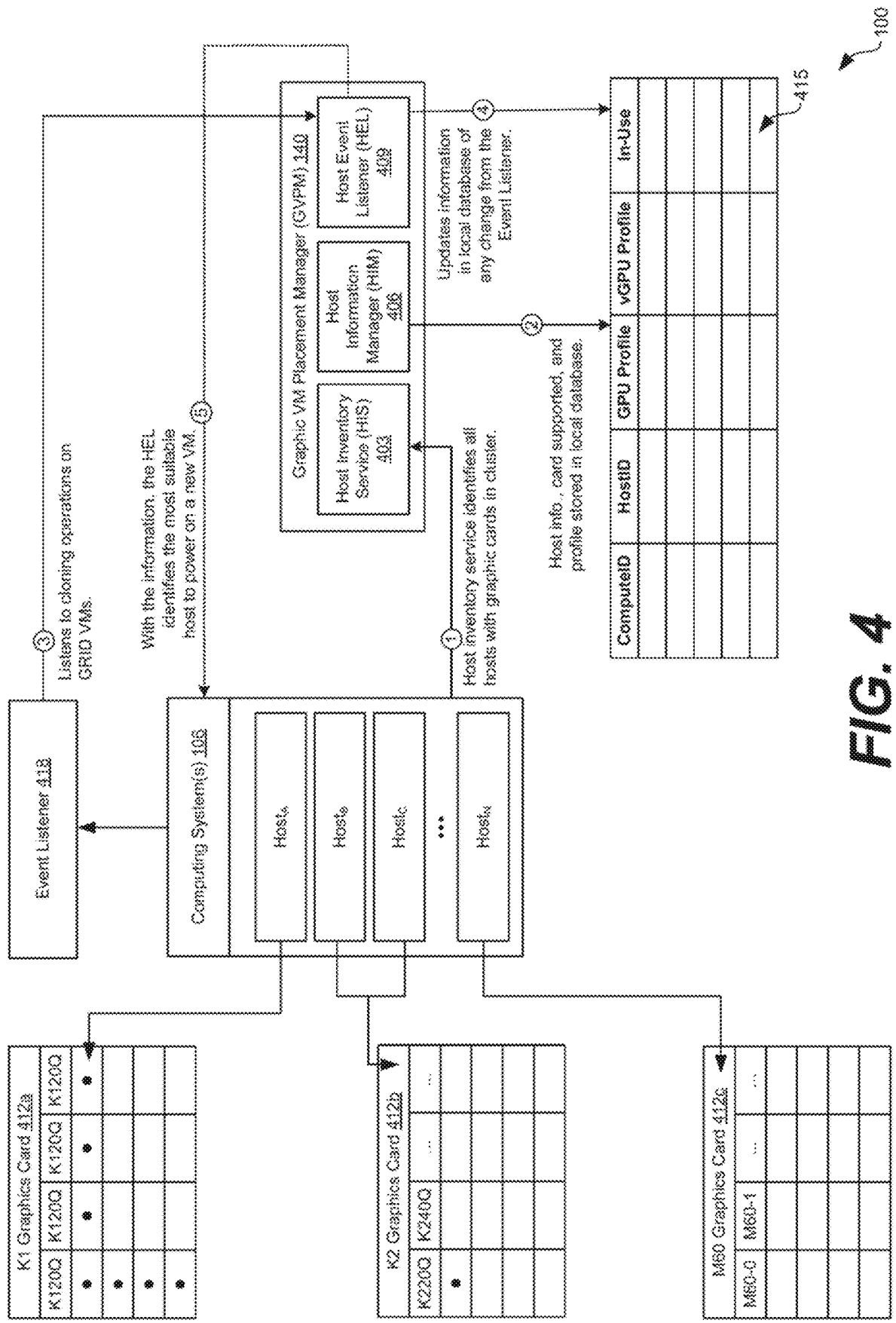
FIG. 4 is a schematic drawing of the virtualization infrastructure of the networked environment of FIG. 1 for provisioning virtual machines on hosts having various graphics cards.

Turning now to FIG. 4, another example of the networked environment 100 is shown according to various examples. In some examples, the GVPM 140 can include, for example, a host inventory service (HIS) 403, a host information manager (HIM) 406, a host event listener (HEL) 409, as well as other applications, services, processes, systems, engines, or functionality not discussed in detail herein. In virtualization infrastructure, a host is generally a server 115 component of a virtual machine as well as the underlying hardware that provides computing resources to support the virtual machine, which is often referred to as a guest or a guest virtual machine. The host can include a host operating system. In some examples, a host can include a hypervisor which can function as the host operating system. A guest system is a virtual guest or virtual machine that is installed under the host operating system.

The host inventory service 403 can maintain information about hosts in a computing cluster formed of one or more racks 112, such as hardware and software specifications for each of the hosts. In some examples, the hardware and software can include graphic cards 412a . . . 412c installed in a host, hardware and software capabilities of the host, compatible GPU profiles, as well as other information. The host information manager 406 can receive information from the host inventory service 403 and maintain the information in a database 415 that can be stored in the data store 130 or other memory. Additionally, the host information manager 406 can receive information from the host even listener 409 regarding power operations, clone operations, or other operations performed on one or more hosts. In some examples, the host information manager 406 can compute and maintain information pertaining to free, used, and remaining virtual machines per host per GPU 121 in the database 415. The host event listener 409 can monitor power operations, clone operations, or operations performed in the computing systems 106. For instance, the host event listener 409 can identify a request for a new virtual machine. In some examples, the host event listener 409 can report identified events to the host information manager 406.

The networked environment 100 can further include an event listener 418 than can be independent of the GVPM 140. The event listener 418 can monitor all events occurring in the computing systems 106 such as creation or termination of a virtual machine. The host event listener 409, on the other hand, can receive operations specific to hosts, such as virtual machine cloning operations or similar operations. In some examples, the event listener 418 can be included as a component of the computing environment 103.

Next, a general description of the operation of the various components of the networked environment 100 is provided. First, the host inventory service 403 can identify all hosts having a graphic cards in a computing cluster formed of one or more computing systems 106. In some situations, hosts are periodically added or removed from a computing system 106. Whenever a new host is discovered, the host inventory service 403 can identify all the capable hosts in a cluster and fetch the specifications of the GPU hardware that is configured on the host. For instance, if an NVIDIA® K1 graphics card is installed in the host, the host inventory service 403 can identify the specifications for the graphics card. In some examples, the host inventory service 403 uses an application programming interface (API) offered through the vSphere by VMWare® service to retrieve information pertaining to the hosts.

Second, the host information manager 406 can maintain information in a database 415 pertaining to each host in the computing systems 106 as well as graphics cards implemented in the hosts sharing computing resources. Further, the host information manager 406 can maintain information pertaining to platform specific GPU profiles 132 associated with each graphics card. In some examples, information associated with the platform specific GPU profiles 132 can include a maximum number of profiles supported by each graphics card 412, a type of profile for a graphics card 412, video memory, as well as other information. In some examples, the database 415 can include a host card allocation table that includes, for example, a compute identifier ("Compute ID") that uniquely identifies a server 115 or a virtual machine, a host identifier ("Host ID") that uniquely identifies a host, a GPU identifier that uniquely identifies a GPU 121, a GPU profile corresponding to the GPU 121, a vGPU profile corresponding to a vGPU, an in-use indicator indicating whether a host is in use, as well as other information.

Third, the host event listener 409 can communicate with the event listener 418 to listen for cloning operations for virtual machines. In some examples, a cloning operation indicates that a new virtual machine is being created or a virtual machine is being migrated from one host to another. Fourth, the host event listener 409 can thus monitor for any changes to the cluster pertaining to additions or removals of hosts and the host event listener 409 can update the database 415 accordingly. In some examples, when the GVPM 140 identifies a clone request, the GVPM 140 can identify whether the virtual machine is "graphics enabled" or, in other words, whether the virtual machine will use graphics computing resources. In some examples, the GVPM 140 can receive a configuration specified using the user interface 300 of FIG. 3 which can include, for example, video memory requirements, CPU requirements, RAM requirements, and other parameters specified by an administrator when creating one or more virtual machines. In further examples, the configuration can include a preferred graphics card, as shown in the user interface 300 of FIG. 3.

With the rapid change in computing technology, new graphic cards are frequently released. The GVPM 140 can allocate or assign virtual machines to hosts based on a graphic card preference specified in the configuration. In some examples, placement and deletion operations in which a virtual machine is assigned or removed from a host can accept a preference order as a parameter of the operator. To this end, in some examples, the GVPM 140 can attempt to place a new virtual machine on a first preferred card specified by the administrator and continue attempting placement on a host until the GVPM 140 has succeeded to power on a virtual machine or, alternatively, the GVPM 140 has analyzed all possible options to power on the virtual machine. An example of a graphics cards having an order of preference based on release dates of graphic cards offered by NVIDIA® (with latest cards given maximum preference) is shown below in Table 2:

TABLE 2

Example of Preference Order for Graphics Cards

| Graphics Card | Preference |
| --- | --- |
| NVIDIA ® M60 | 1 |
| NVIDIA ® M10 | 2 |
| NVIDIA ® K2 | 3 |
| NVIDIA ® K1 | 4 |

Turning now to FIGS. 5A-5E, an example of a computing system 106 is shown having a computing cluster having two hosts, Host$_A$ and Host$_B$. Host$_A$ can include a graphics card 412a and Host$_B$ can also include a graphics card 412b. For illustrative purposes, the graphics card 412a of Host$_A$ can include the NVIDIA® K1 card having four Kepler GPUs 121, where each GPU 121 has 4 GB of memory size for a total memory size of 16 GB. The graphics card 412b of Host$_B$ can include the TESLA® M10 card having four GPUs 121, where each GPU 121 has 8 GB of memory size for a total memory size of 32 GB. As the cluster is formed of hosts having different makes and models of graphics cards 412, the cluster can be referred to as a heterogeneous cluster.

Each graphics card 412 can support multiple profiles, where each profile has an associated frame buffer memory. An empty block in the graphics cards 412a shown in FIG. 5A indicates an available 2 GB of frame buffer memory while an empty block in the graphics cards 412b indicates an available 2 GB of frame buffer memory.

Figure 5A:
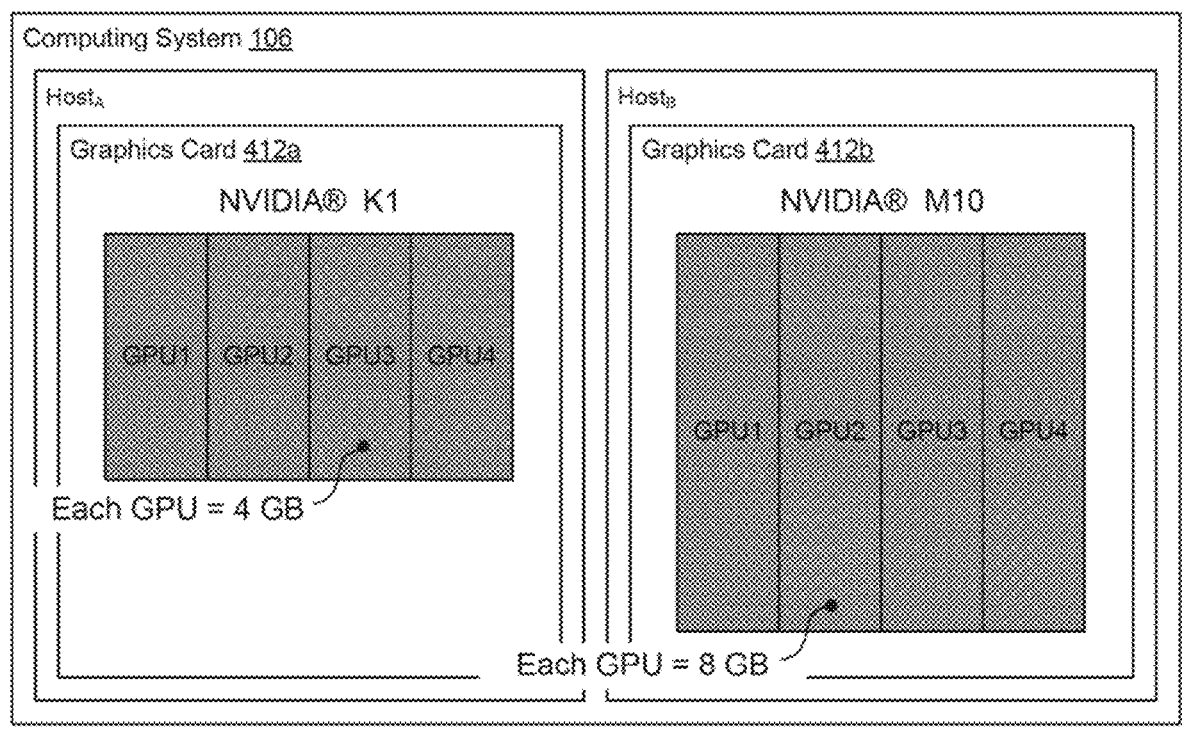
FIGS. 5A-5E are block diagrams illustrating current inefficiencies in assignment of virtual machines to hosts in a cluster.
Figure 5B:
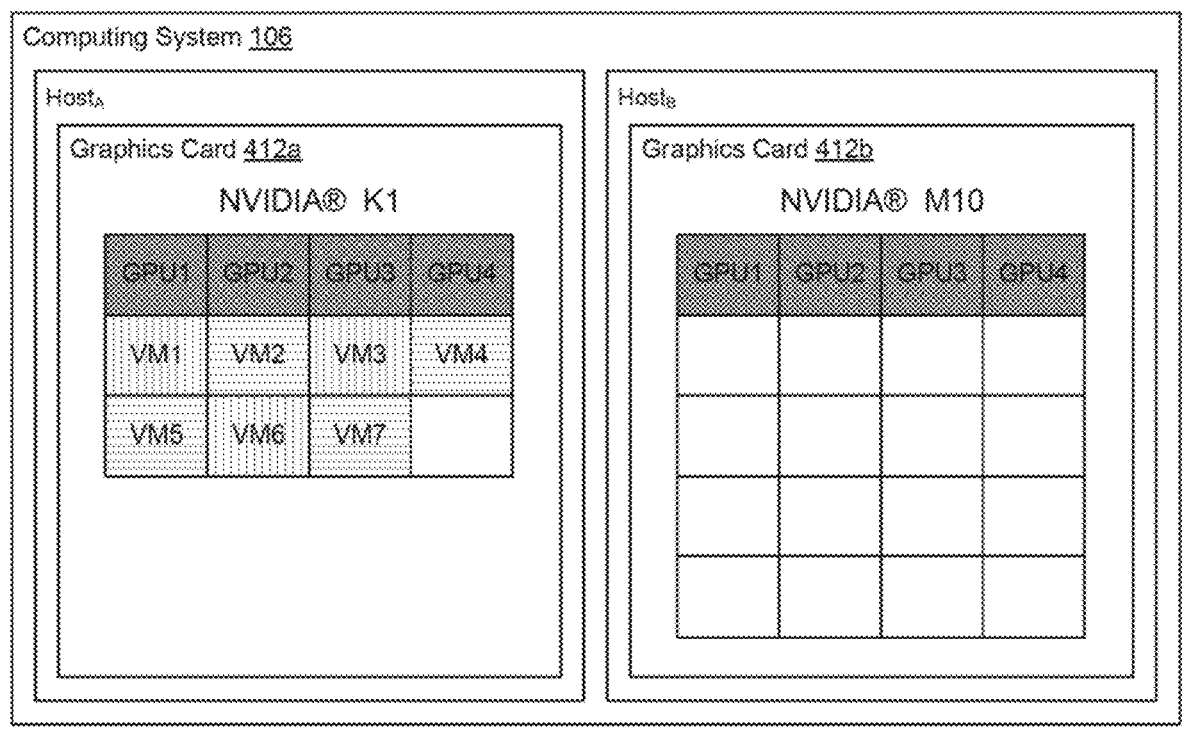
Figure 5C:
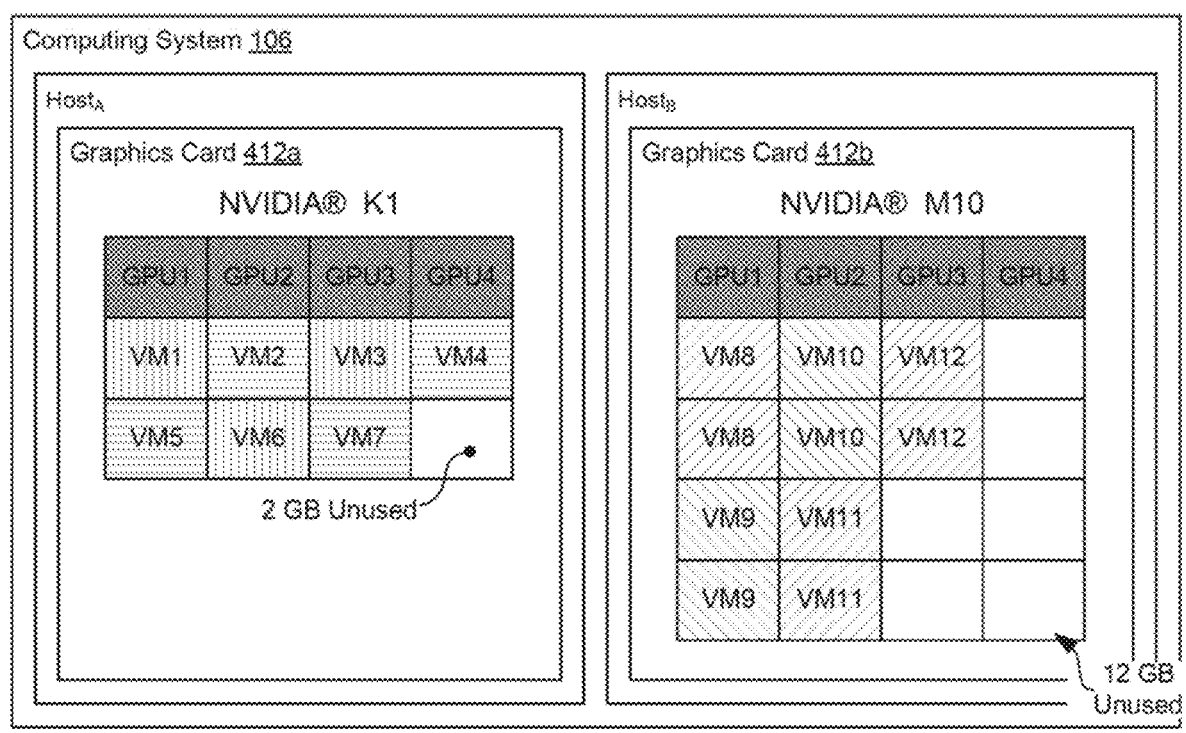

A scenario for an administrator can include provisioning a pool of virtual machines cloned from a same gold image or a same virtual machine template on the Horizon platform by VMWare®. Assuming a pool of seven virtual machines having a 2 GB frame buffer each, the administrator can successfully configure a parent virtual machine with the NVIDIA® K260q profile and clone the parent virtual machine to create seven instances (VM1 to VM7), which fill $Host_A$ as shown in FIG. 5B. Similarly, assuming a pool of five virtual machines having a 4 GB frame buffer each, the administrator can successfully configure a parent virtual machine with the NVIDIA® M10-4q profile and clone the parent virtual machine to create five instances (VM8 to VM12), which fill $Host_B$ as shown in FIG. 5C. The division of each GPU 121 is shown for illustrative purposes.

Thereafter, assuming an administrator desires to provision a pool of six virtual machines, where each virtual machine has a 2 GB frame buffer memory, the administrator is unable to successfully provision the virtual machines. As is shown in FIG. 5C, only a single GPU 121 is available, namely, GPU4 of the graphics card 412b of $Host_B$. However, the graphics card 412b can only host up to four virtual machines of 2 GB each, which have already been provisioned on $Host_B$. Thus, despite the graphics card 412a in $Host_A$ and the graphics card 412b in $Host_B$ having frame buffer memory available to fulfill the provisioning, current restraints due to platform specific GPU profiles 132 inhibit virtual machines being provisioned on the graphics cards 412. Thus, current implementations provide an incredibly inefficient use of GPU resources.

Figure 5D:
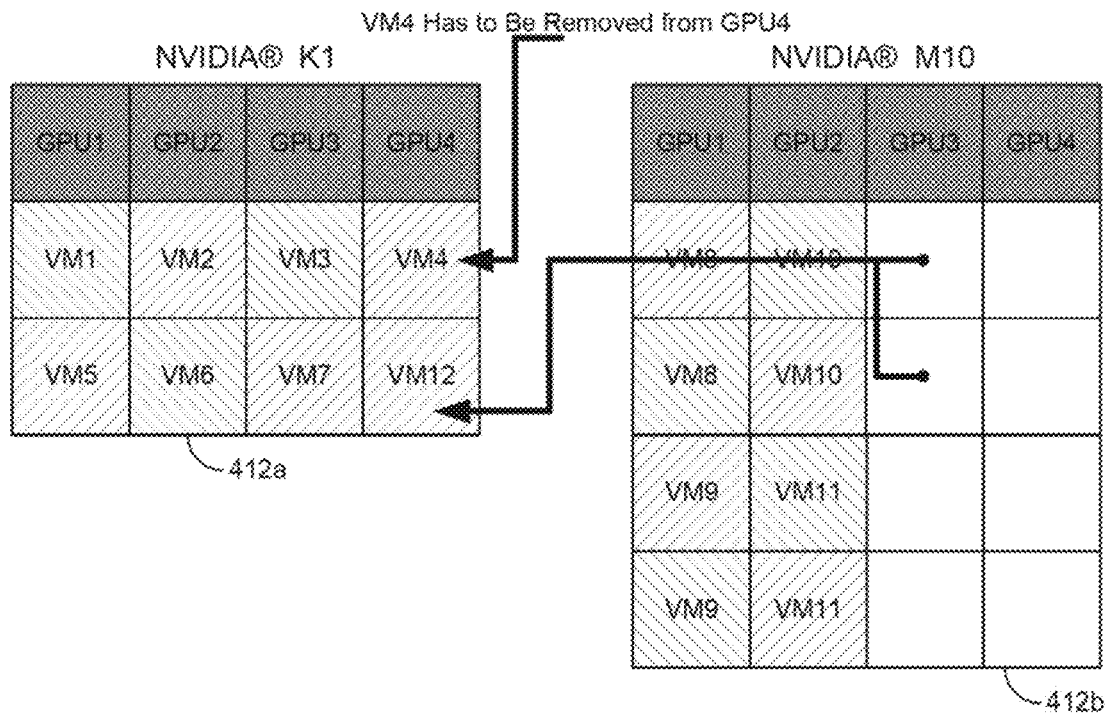
Figure 5E:
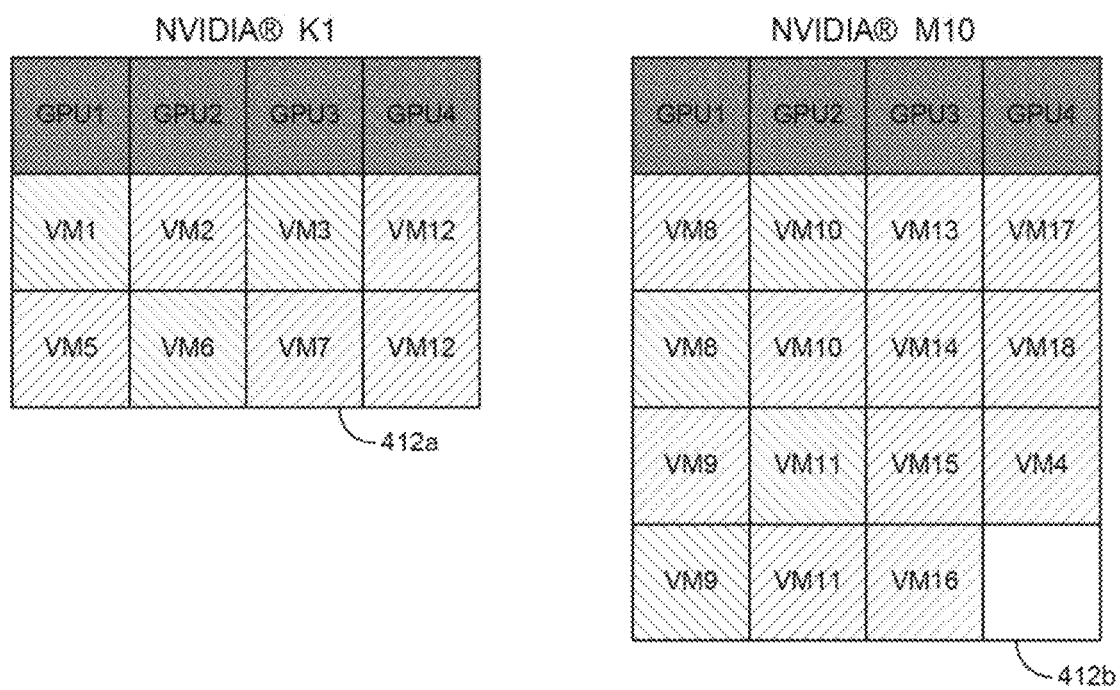

Looking again at FIG. 5C, 2 GB of frame buffer memory is available on GPU4 of $Host_A$. Additionally, 4 GB and 8 GB of frame buffer memory is available on GPU3 and GPU4 of $Host_B$, respectively, for a total of 12 GB. Although six virtual machines having a 2 GB frame buffer require a total of 12 GB (which is available on $Host_B$), GPU3 of $Host_B$ is already occupied by a virtual machine having a 4 GB frame buffer size (VM12) and, thus, GPU3 of $Host_B$ cannot accommodate any virtual machines having other types of platform specific GPU profiles 132. This is a design constraint by NVIDIA® for GRID GPU cards. The administrator can merely use GPU4 on $Host_B$ to accommodate four of the six virtual machines in the pool having a 2 GB frame buffer. Referring to FIGS. 5D and 5E, if the virtual machine having the 4 GB frame buffer on GPU3 of $Host_B$ (VM12) were instead placed on GPU4 of $Host_A$ and the virtual machine having the 2 GB frame buffer on GPU4 of $Host_A$ (VM7) were placed on GPU3 on $Host_B$, the administrator would be able to provision the required six virtual machines (VM13 to VM18) in the pool.

Figure 6:
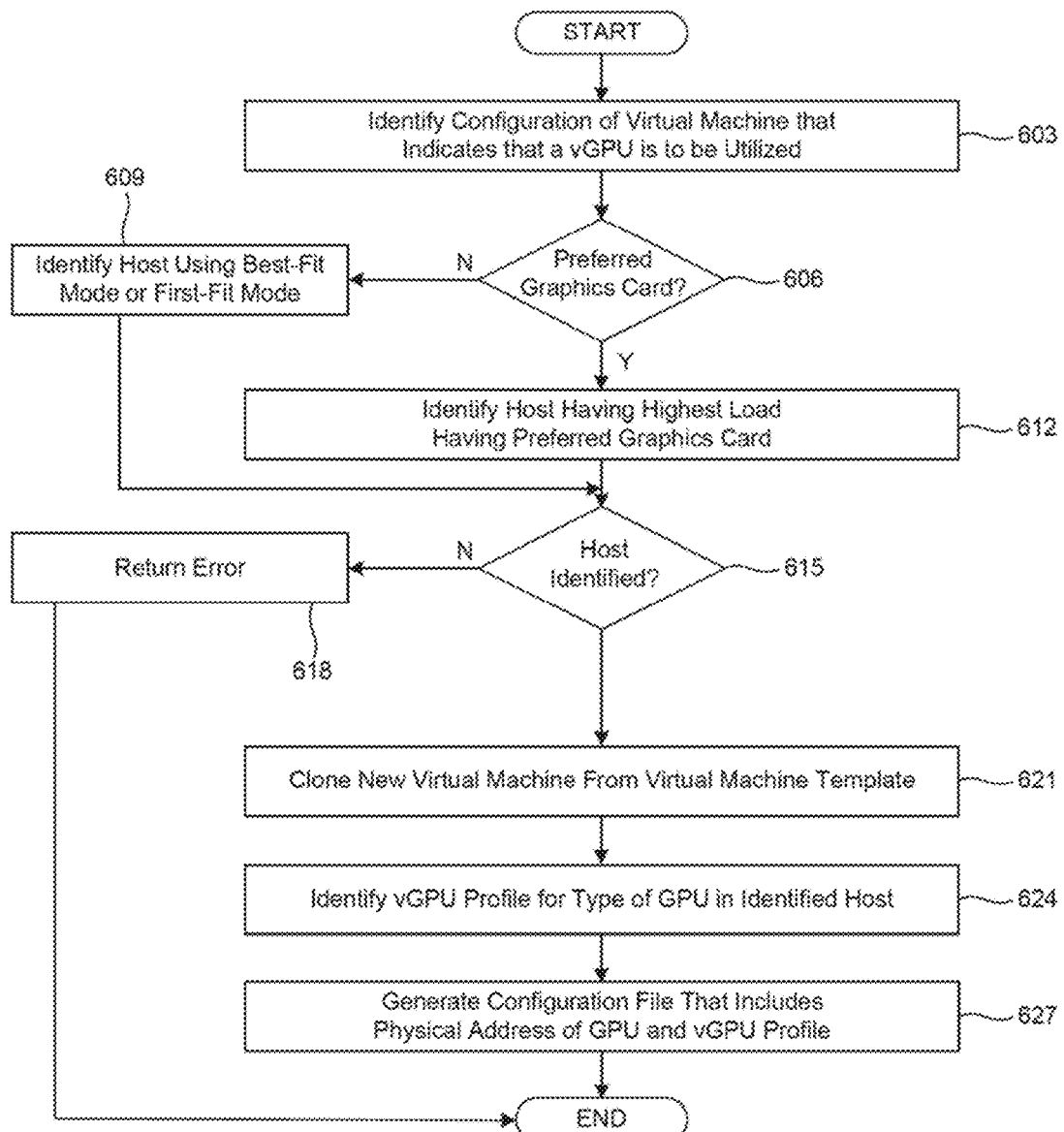
FIGS. 6-8 are flowcharts illustrating functionality implemented by components of the virtualization infrastructure and networked environment.

Moving on to FIG. 6, shown is a flowchart that provides one example of the operation of a portion of the networked environment 100. The flowchart of FIG. 6 can be viewed as depicting an example of elements of a method implemented by the management service 135 or the GVPM 140 executing in the computing environment 103 according to one or more examples. The separation or segmentation of functionality as discussed herein is presented for illustrative purposes only.

Considering the examples described in FIGS. 5A-5E, the issues faced by administrators in efficiently provisioning virtual machines are evident using current approaches. For instance, administrators are required to manually keep track of GPU resources on each host as well as usage of each host. Referring to the example of FIG. 5B, to place the five virtual machines having a 4 GB frame buffer each, the administrator would be required to check the available capacity in each host to find a suitable host to accommodate each of the virtual machines. Secondly, the administrator has to remain conscious of platform specific GPU profiles 132 that are supported on each card so that the administrator can configure the parent virtual machines. For instance, to provision five virtual machines on $Host_B$, the administrator would have to research product specifications for the NVIDIA® M10 graphics card 412 to identify a profile matching the configuration of the virtual machines. Moreover, even though resources were available in HostA and HostB, the administrator would not be able to fulfill the provisioning of the final six virtual machines, even though there are sufficient resources available in the computing system 106.

Accordingly, various examples for provisioning virtual machines are provided, namely, using a platform independent GPU profile 134 that permits placement of a virtual machine in a most suitable of the hosts despite limitations of current platform specific GPU profiles 132. Beginning with step 603, the GVPM 140 can identify a configuration of a virtual machine that indicates that a vGPU is to be utilized in an execution of the virtual machine. For instance, an administrator can interact with the user interface 300 of FIG. 3 to specify graphics computing requirements for a virtual machine that can be used to generate a platform independent GPU profile 134, as opposed to providing a platform specific GPU profile 132, as shown in the user interface 200 of FIG. 2.

In step 606, the GVPM 140 can determine whether the configuration identified in step 603 includes a preferred graphics card. For instance, as shown in the user interface 300 of FIG. 3, an administrator can specify a preferred graphics card in some examples. For instance, assuming a virtual machine is being created to host a graphics intensive application, such as CAD, the administrator can specify a newer or more powerful type of graphics card 412 to host the virtual machine. Alternatively, assuming a virtual machine is being created to host a non-intensive application, the administrator can specify an older or less powerful type of graphics card 412 to host the virtual machine.

If the configuration of the virtual machine does not specify a preferred graphics card, the process can proceed to step 609. In step 609, the GVPM 140 can identify a host available in the computing system 106 to place the virtual machine using a best-fit or a first-fit mode of assignment. Operation of the best-fit and first-fit modes of assignment are described in greater detail with respect to the flowcharts of FIGS. 7 and 8, respectively. Thereafter, the process can proceed to step 615, as will be discussed.

Referring back to step 606, if a preferred graphics card is specified in the configuration, the process can proceed to step 612. In step 612, the GVPM 140 can identify the host having the preferred graphics card installed thereon and having the highest load can be identified. The load can include, for example, a number of virtual machines provisioned on the host. By assigning the virtual machine to the host having the highest load, virtual machines are consolidated on hosts allowing resources to remain available on other hosts for future virtual machine assignment.

Ultimately, the GVPM 140 can identify a host using criteria specified in the configuration of the virtual machine, such as the graphics computing requirements of the virtual machine. In some situations, a host meeting the requirements specified in step 609 or step 612 may not be available or may not exist. Accordingly, in step 615, the GVPM 140 can determine whether a host has been identified. If at least one host has not been identified, the process can proceed to step 618.

In step 618, the GVPM 140 can return an error to the administrator if a host suitable host in unable to be identified in step 612. For instance, if an administrator has provisioned a virtual machine using particular criteria in the configuration, the GVPM 140 can provide an error to the administrator indicating that the virtual machine could not be provisioned given the criteria provided in the configuration. Thereafter, the process can proceed to completion.

Referring back to step 615, if at least one host has been identified meeting the criteria specified in the configuration, the process can proceed to step 621. In step 621, the GVPM 140 can create a new virtual machine. In some examples, the GVPM 140 maintains a virtual machine template. The GVPM 140 can provision new virtual machines for example, by cloning the virtual machine template as needed to arrive at a desired number of virtual machines.

In step 624, the GVPM 140 can identify a platform specific GPU profile 132, such as a vGPU profile, for a type of GPU 121 in the identified host. For instance, if the GVPM 140 determines to place a virtual machine on GPU4 of Host$_A$ based on the graphics computing requirements specified in the configuration of the virtual machine, a vGPU profile compatible with the NVIDIA® K1 card can be identified using a type of the graphics card 412 as well as the graphics computing requirements specified in the configuration.

Thereafter, in step 627, the GVPM 140 can generate a configuration file, such as a .vmx virtual machine file, that includes, for example, the physical address of a GPU 121 of the host to which the virtual machine is assigned, a vGPU profile corresponding to the assigned GPU 121, as well as other information specified in the configuration of the virtual machine or required for configuring the virtual machine in accordance with the criteria specified by the administrator. Thereafter, the process can proceed to completion.

Figure 7:
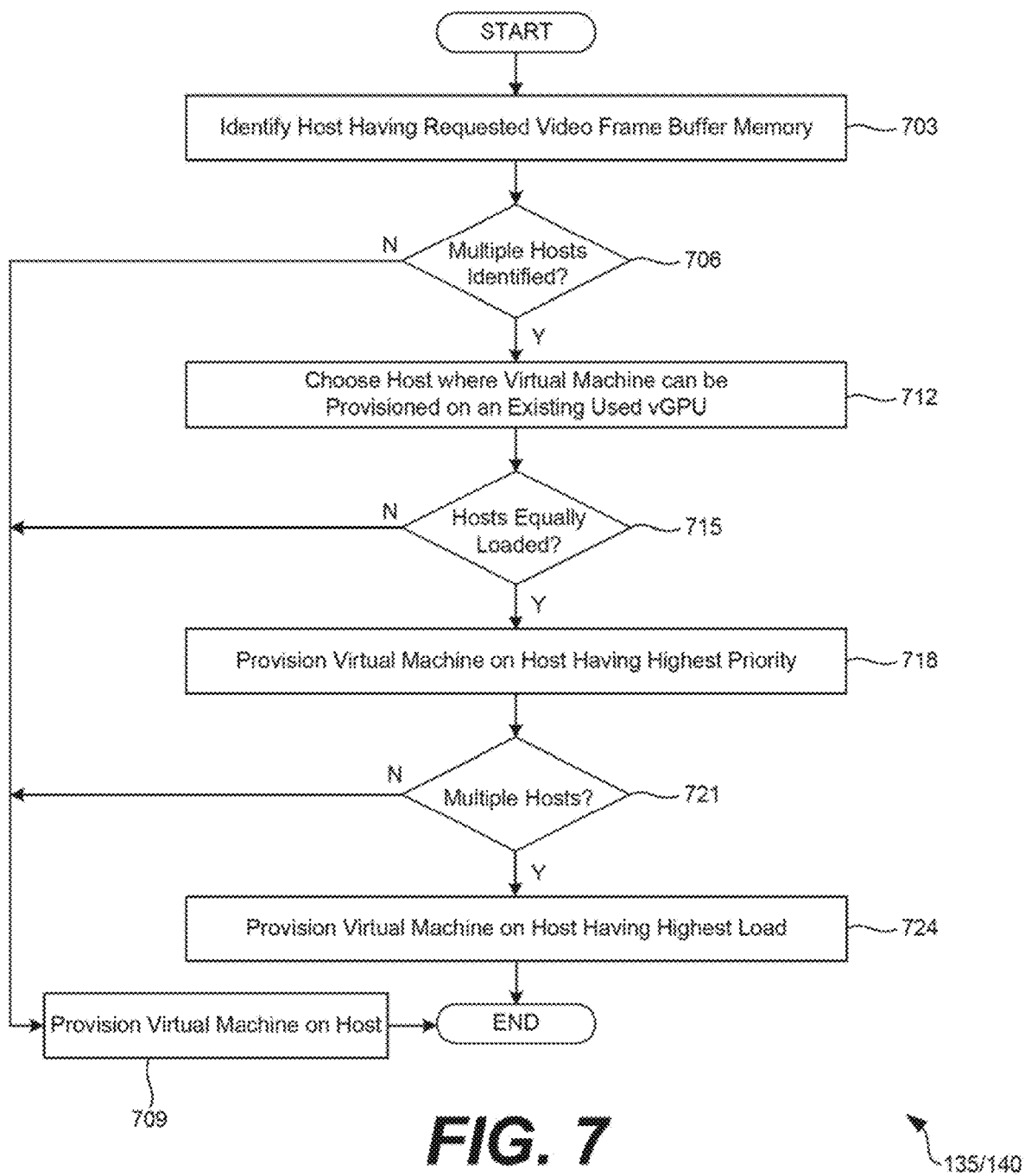

Turning now to FIG. 7, shown is a flowchart that provides one example of the operation of a portion of the networked environment 100. The flowchart of FIG. 7 can be viewed as depicting an example of elements of a method implemented by the management service 135 or the GVPM 140 executing in the computing environment 103 according to one or more examples. The separation or segmentation of functionality as discussed herein is presented for illustrative purposes only.

As noted in FIG. 6, in some examples, the GVPM 140 can assign virtual machines that require graphics processing resources to one or more hosts based on a configuration of the virtual machine. In some examples, the GVPM 140 can assign virtual machines to graphics processing resources on a best-fit mode of assignment.

Beginning with step 703, the GVPM 140 can identify a host having the requested video frame buffer memory which can be specified by administrator in the configuration of a virtual machine. For instance, the GVPM 140 can identify a GPU 121 of a host having an available video frame buffer memory that is equal to or greater than a required video frame buffer memory specified in the configuration of a virtual machine.

Next, in step 706, the GVPM 140 can determine whether multiple hosts have been identified. As can be appreciated, more than one host can meet the video frame buffer memory specified in the configuration of a virtual machine.

If the GVPM 140 only identifies a single host, the process can proceed to step 709. In step 709, the GVPM 140 can provision the virtual machine on the host identified in step 703. Provisioning of the virtual machine can include, for example, performing step 621, step 624, and 627 as described with respect to FIG. 6. Thereafter, the process can proceed to completion.

Referring back to step 706, if multiple hosts are identified in step 703, the process can proceed to step 712. In step 712, the GVPM 140 can choose one of the identified hosts where a virtual machine can be provisioned on an existing used vGPU. By assigning the virtual machine to the host having an existing used vGPU, virtual machines are consolidated on hosts allowing resources to remain available on other hosts for future virtual machine assignment.

However, again, multiple hosts can be identified that are equally loaded with virtual machines. Hence, in step 715, the GVPM 140 can determine whether multiple hosts exist that are equally loaded. If only a single host is identified in step 712, the process can proceed to step 709 to provision the virtual machine on the host identified in step 712. Thereafter, the process can proceed to completion.

Alternatively, if multiple hosts are identified in step 712 that are equally loaded, the process can proceed to step 718. In step 718, the GVPM 140 can provision the virtual machine on a host having a highest priority. As shown above with respect to Table 2, a priority can be assigned to various graphics cards or GPUs 121 residing thereon. In some examples, the priority can be based on a release date of the graphics card 412, performance or other specifications of the graphics card 412, or specified by an administrator.

Again, in step 721, the GVPM 140 can determine whether multiple hosts have been identified, for example, having a same priority. For instance, two or more graphics cards 412 having a same make and model (thus having a same release date) can be identified in step 718. If only a single host is identified, the process can proceed to step 709 to provision the virtual machine on the host identified in step 718. Thereafter, the process can proceed to completion.

Alternatively, if multiple hosts have again been identified, the process can proceed to step 724. In step 724, the GVPM 140 can provision the virtual machine on one of the host identified in step 718 having a highest load. In other words, a host having the highest amount of used resources or virtual machines executing thereon can be identified. By assigning the virtual machine to the host having an existing used vGPU, virtual machines are consolidated on hosts allowing resources to remain available on other hosts for future virtual machine assignment. Thereafter, the process can proceed to completion.

Figure 8:
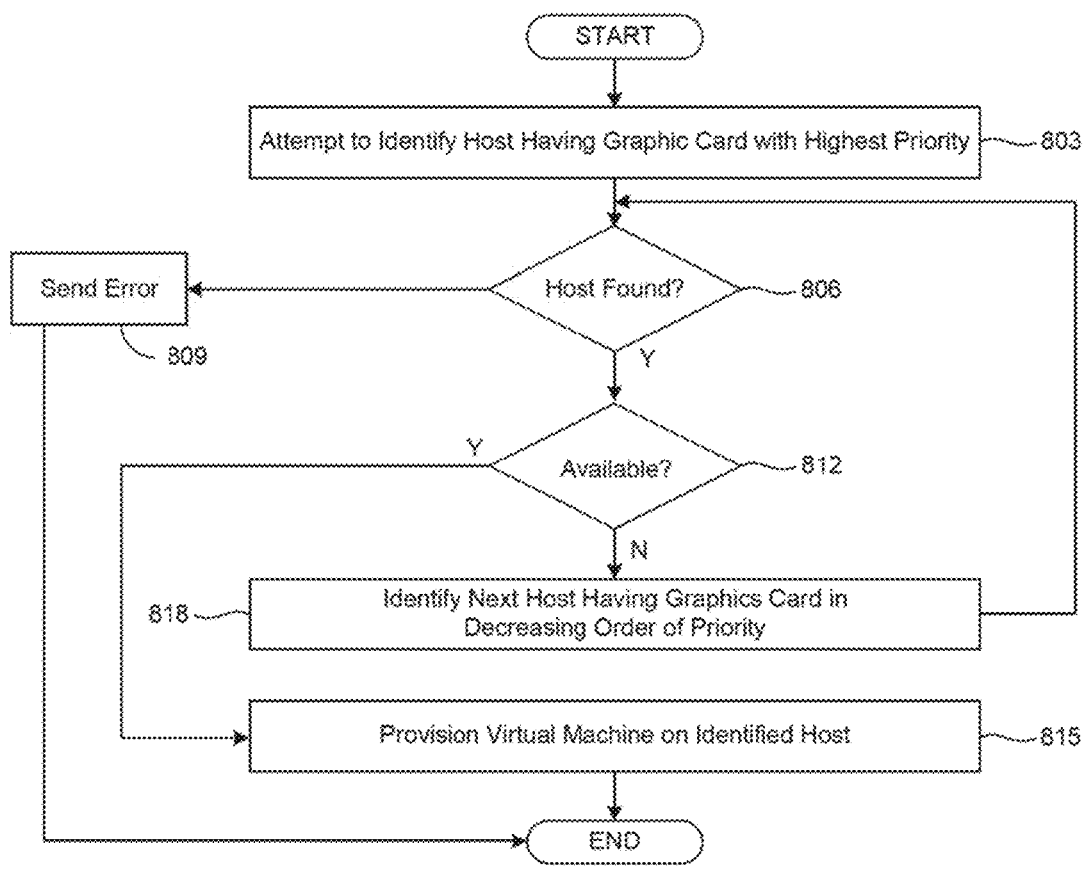

Referring next to FIG. 8, shown is a flowchart that provides one example of the operation of a portion of the networked environment 100. The flowchart of FIG. 8 can be viewed as depicting an example of elements of a method implemented by the management service 135 or the GVPM 140 executing in the computing environment 103 according to one or more examples. The separation or segmentation of functionality as discussed herein is presented for illustrative purposes only.

As noted in FIG. 6, in some examples, the GVPM 140 can assign virtual machines that require graphics processing resources to one or more hosts based on a configuration of the virtual machine. In some examples, the GVPM 140 can assign virtual machines to graphics processing resources on a first-fit mode of assignment.

Beginning with step 803, the GVPM 140 can attempt to identify a host having a highest priority. As shown above with respect to Table 2, a priority can be assigned to various graphics cards or GPUs 121 residing thereon. In some examples, the priority can be based on a release date of the graphics card 412, performance or other specifications of the graphics card 412, or specified by an administrator.

Next, in step 806, the GVPM 140 can determine whether a host has been located to place the virtual machine. If no host is located or found, the process can proceed to step 809 to send an error message to an administrator or other user. Thereafter, the process can proceed to completion.

Referring back to step 806, if a host has been found, the process can proceed to step 812. In step 812, the GVPM 140 can determine whether the host identified in step 803 is available to place the virtual machine. For instance, the GVPM 140 can determine whether the virtual machine can be successfully provisioned on the host given the graphics computing requirements specified in the configuration of the virtual machine.

If the host identified in step 803 is available, the process can proceed to step 815 to provision the virtual machine on the identified host. Provisioning of the virtual machine can include, for example, performing step 621, step 624, and 627 as described with respect to FIG. 6. Thereafter, the process can proceed to completion.

Referring back to step 812, if the host having the highest priority is unavailable to successfully provision the virtual machine, the process can proceed to step 818. In step 818, the GVPM 140 can identify the next host having the most preferred card in a decreasing order of priority. In other words, the GVPM 140 can first attempt to power on or provision a virtual machine on the most preferred card with a ranking, for example, described in Table 2. If the GVPM 140 fails to provision the virtual machine on the host with first graphic card, it can attempt placement on other hosts using a decreasing order of priority of graphic cards. After completion of step 818, the process can revert to step 806 to determine whether a host has been found and, if so, process to step 812 to determine whether the next host is available. This process can iterate until a host can successfully been identified for placement of the virtual machine. Thereafter, the process can proceed to completion.

Once the GVPM 140 successfully identifies the host, for example, the GVPM 140 can clone the new virtual machine from a template virtual machine to the identified host. Thereafter, a .vmx entry can be generated or "injected," where the .vmx entry includes a physical address of an assigned GPU 121 and a corresponding vGPU profile (platform specific GPU profile 132). If more than one host are equally loaded, the GVPM 140 can choose a host having a higher ranked graphics card 412 or GPU 121.

Apart from creating new virtual machines, in some scenarios, virtual machines was be deleted or otherwise removed. The GVPM 140 can handle requests to delete virtual machines for different scenarios, such as when virtual desktop infrastructure (VDI) is employed in a virtualization environment. The GVPM 140 can handle deletion of the virtual machines to provide for a more efficient use of graphics processing resources. A request to delete a virtual machine includes an identifier that uniquely identifies a virtual machine to be deleted. In some examples, the GVPM 140 can be configured to not refrain from performing any analysis before deleting a static virtual machine.

However, the GVPM 140 can handle requests to delete a virtual machine specific to VDI, such as VMware® Horizon desktop products which provides non-persistent desktop sessions where any of the desktops in a pool are allotted to an end user (as opposed to an end user being assigned to a specific virtual machine in a pool). In this situation, no user-specific information is stored in a desktop. A request to shrink a size of a dynamic pool can follow a reverse order of the initial placement described in FIGS. 6-8. For instance, the GVPM 140 can delete the virtual machine residing in the least loaded host first. If two hosts are equally loaded, the GVPM 140 can delete the virtual machine from the host which has a lower ranked graphics card 412.

As can be appreciated, deleting a virtual machine in a static or dynamic pool of virtual machines can result in a non-optimal utilization of graphics resources. However, as certain virtual machines may be in use by an end user, the GVPM can abstain from performing optimizations, such as cold migrations of virtual machines to new hosts, until an application explicitly initiates a request to perform the optimization, for instance, at the request of an administrator. In some examples, an application accessible by an administrator can query the GVPM 140 to determine if any resources are underutilized. If so, an administrator can initiate a request to perform an optimization that includes migrating virtual machines to provide a better allocation of resources. As migrations can be a time-consuming process, the progress of a migration can be monitored using a migration status API in some examples.

Optimization of the virtual machines can operate similar to that of the initial placement, as described in FIGS. 6-8. For instance, the GVPM 140 can re-organize virtual machines considering preferences for graphics cards 412 that were provided in an initial clone request. Thereafter, the GVPM 140 can power off an active virtual machine and migrate the virtual machine from one host to another, if such migration would result in a net benefit of overall usage of resources. In some scenarios, a virtual machine may be migrated to a host with a different graphics card, which is not a supported feature in various virtualization applications, such as vSphere by VMWare®. In this a scenario, the GVPM 140 can perform a cold migration of a virtual machine between hosts having different types of graphic cards 412 to support various types of graphic cards 412 in a computing cluster.

Currently, a migration of virtual machines that utilize GPUs 121 or other graphics processing resources requires that two hosts be identical in terms of the graphic cards 412. For example, a virtual machine assigned to a host having an NVIDIA® M60 type of graphics cards 412 must be migrated to another host having an NVIDIA® M60 type of graphics card 412. However, using a platform independent GPU profile 134, as described herein, the GVPM 140 can migrate a virtual machine from a host that has a first type of graphics card 412, such as the NVIDIA® M60, to a that has a second type of graphics card 412, such as the NVIDIA® K1 (or a graphics card 412 having a different make or model). The GVPM 140 can thus locate a platform specific GPU profile 132 for the new host while having the same frame buffer memory. For instance, a virtual machine initially assigned to an NVIDIA® GRID M60-1q profile can be reassigned to the NVIDIA® K140Q profile, as both these platform specific GPU profiles 132 support a 1 GB frame buffer.

Each virtual machine that utilizes GPU or vGPU resources may require a client driver that needs to be installed in the virtual machine in order to execute properly in an environment. In some examples, when the GVPM 140 migrates a virtual machine between two hosts having graphic cards from different vendors, the GVPM 140 can install a driver applicable for the new host. In some examples, the GVPM 140 can identify a type of graphics card 412 residing in a host assigned to a virtual machine and the GVPM 140 can download a corresponding driver from a suitable file share path.

Figure 9A:
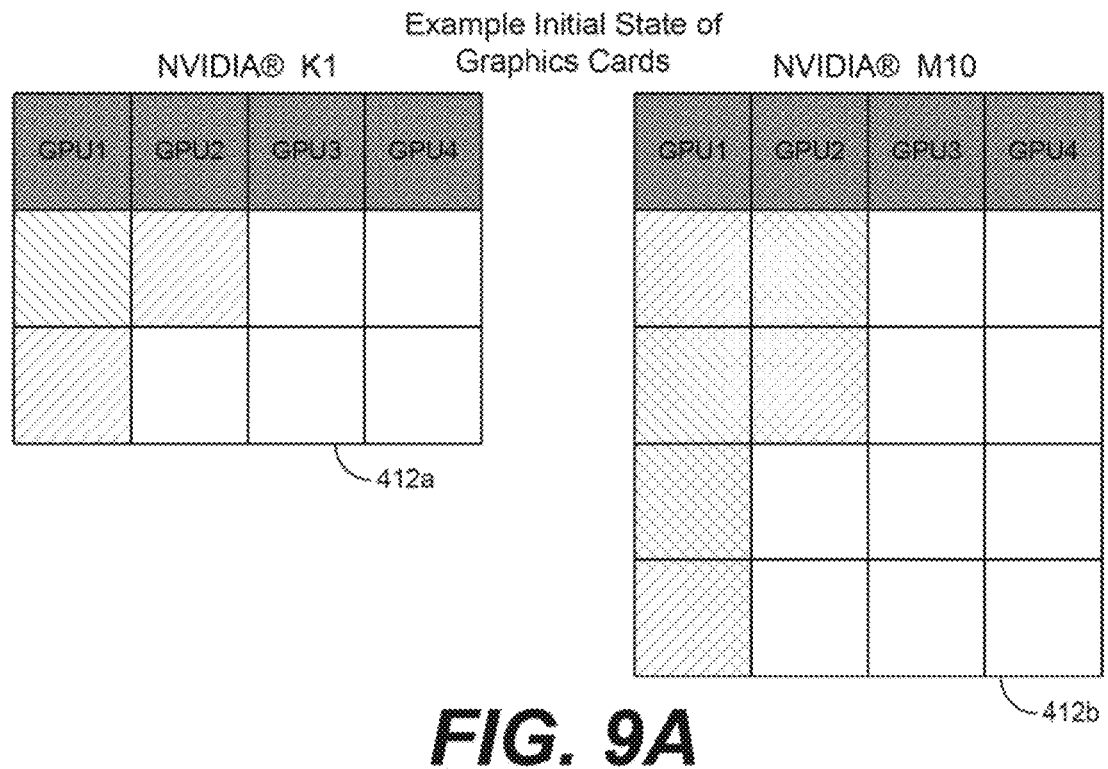
FIGS. 9A-9D are block diagrams illustrating benefits and gained efficiencies in provisioning virtual machines according to the examples described herein.
Figure 9B:
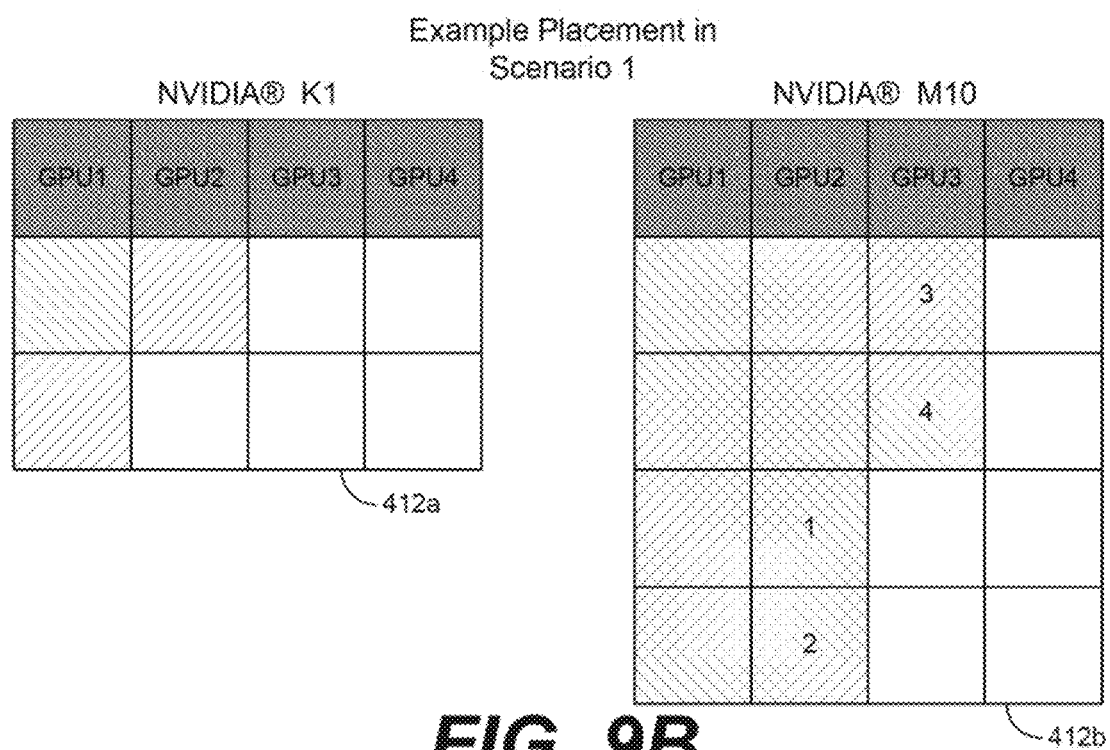
Figure 9C:
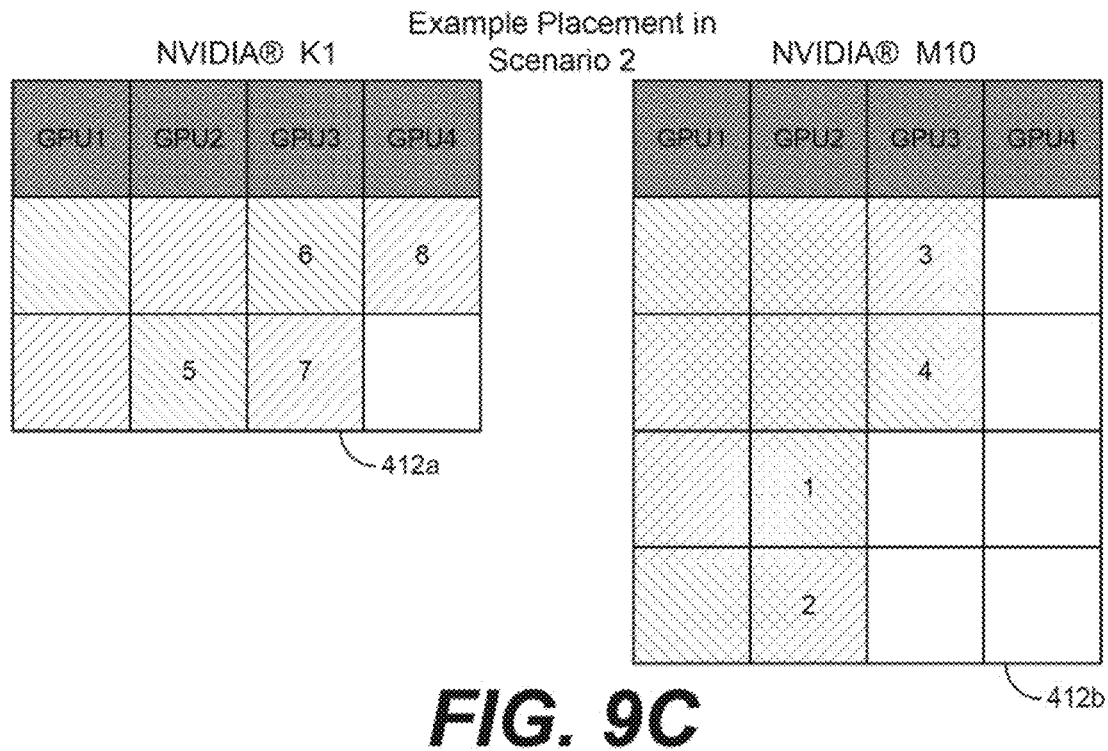

Turning now to FIGS. 9A-9C, an example of a computing system 106 can include two hosts, $Host_A$ and $Host_B$, where $Host_A$ includes a graphics card 412a and $Host_B$ includes a graphics card 412b. For illustrative purposes, the graphics card 412a of $Host_A$ can include the NVIDIA® K1 card having four Kepler GPUs 121, where each GPU 121 has 4 GB of memory size for a total memory size of 16 GB and the graphics card 412b of $Host_B$ can include the TESLA® M10card having 4 GPUs 121, where each GPU 121 has 8 GB of memory size for a total memory size of 32 GB. An example initial state of the graphics cards 412 with respect to a placement of virtual machines is shown in FIG. 9A where example assignment of virtual machines will be described with respect to FIGS. 9B and 9C. In FIG. 9A, each GPU 121 in the NVIDIA® K1 type of graphics card 412a can support two 2 GB vGPU virtual machines while each GPU 121 in the NVIDIA® M10 type of graphics card 412b can support four 2 GB vGPU virtual machines.

In a first scenario, a configuration of a new virtual machine may not include a preference for a particular type, make, or model of graphics card 412. For instance, the GVPM 140 can receive a clone request for four 2 GB vGPU virtual machines with no preferred graphics card 412 or GPU 121. As no preference is specified, the GVPM 140 can allocate available slots in the NVIDIA® M10, as it has a higher ranking in Table 2, as shown in FIG. 9B.

In a second scenario, a configuration of a new virtual machine can include a preference for the NVIDIA® K1 type of graphics card 412a. For instance, the GVPM 140 can receive a clone request for four 2 GB vGPU virtual machines with a preference for the NVIDIA® K1 type of graphics card 412a. As a preference is specified, the GVPM 140 can allocate available slots in the NVIDIA® M10, as it has a higher ranking in Table 2, as shown in FIG. 9B. After placement of the virtual machines in the second scenario, the remaining capacity without preference is seven, the remaining capacity with a preference for the K1 type of graphics card 412a is one, and the remaining capacity with a preference for the M10 type of graphics card 412b is six, as shown in FIG. 9C.

Figure 9D:
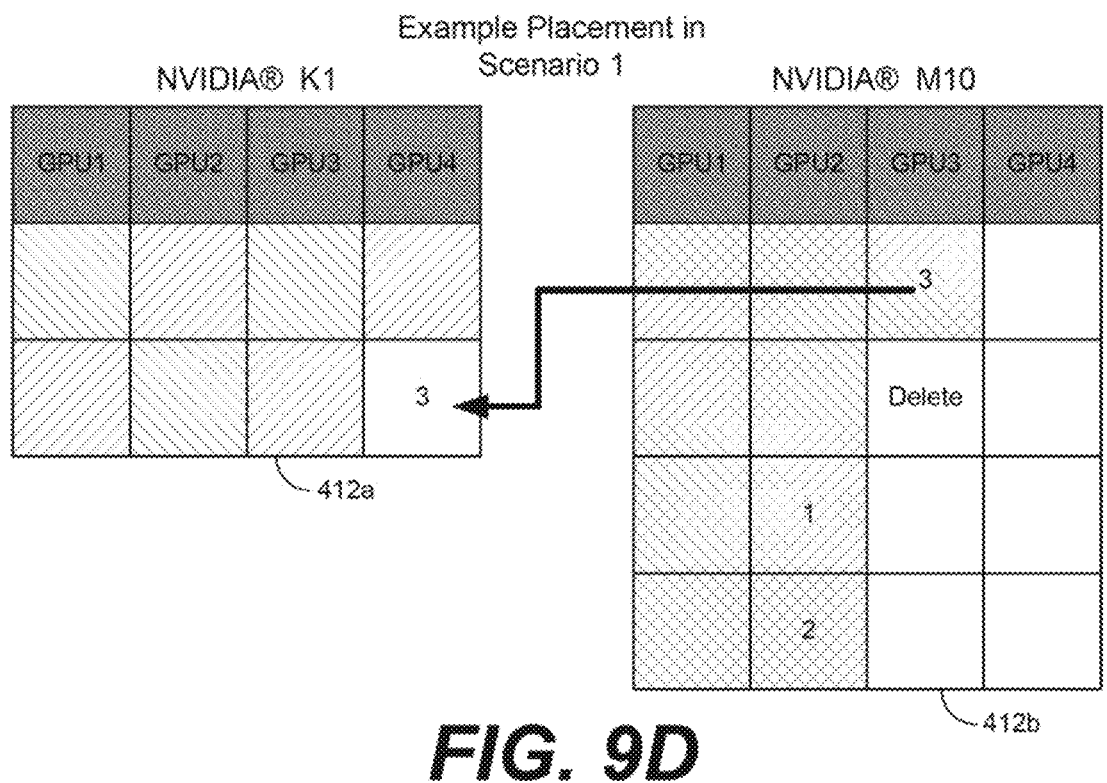

In a third scenario, shown in FIG. 9D, the GVPM 140 can identify a request to delete a virtual machine, VM4 in this example, having a 2 GB vGPU profile from the M10 type of graphics card 412b. As VM3 was created and assigned to GPU3 in the M10 type of graphics card 412b without preference, the GVPM 140 can identify that VM3 is a candidate for a migration to the K1 type of graphics card 412a. As can be appreciated, the migration of VM3 frees GPU3 of the M10type of graphics card 412b.

With the introduction of a GVPM 140, many benefits can be realized while provisioning GRID vGPU configured virtual machines as well as other GPU configured virtual machines. While many examples described herein are applicable to the NVIDIA® GRID platform, the various examples described herein are applicable to other platforms having similar graphics virtual machine implementations. For instance, the various examples described herein can be applied to the AMD® Multiuser GPU platform.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the management service 135. These client devices can include a display upon which a user interface generated by a client application can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
at least one computing device comprising at least one processor and at least one memory;
program instructions executable in the at least one computing device that, when executed by the at least one computing device, cause the at least one computing device to:
identify a configuration of a virtual machine that indicates that a virtual graphics processing unit (vGPU) is to be utilized in an execution of the virtual machine, the configuration comprising a graphics computing requirement comprising a preferred graphics card for the virtual machine, wherein the configuration is platform independent;
identify a plurality of hosts available in a computing environment to place the virtual machine, wherein each of the plurality of hosts comprises at least one of a plurality of physical graphics processing units (GPUs); and
identify one of the plurality of hosts to place the virtual machine based at least in part on the graphics computing requirement, the one of the plurality of hosts being identified based at least in part on and identification of an available one of the plurality of hosts comprising the preferred graphics card having a highest host load.

2. The system of claim 1, wherein the graphics computing requirement further comprises at least one of: a video memory requirement, a central processing unit (CPU) requirement, and a random-access memory (RAM) requirement.

3. The system of claim 2, wherein the virtual machine is associated with a virtual machine template.

4. The system of claim 1, further comprising program instructions executable in the at least one computing device that, when executed by the at least one computing device, cause the at least one computing device to:
place the virtual machine on the available one of the plurality of hosts comprising the preferred graphics card and having the highest host load by:
cloning a template virtual machine to the available one of the plurality of hosts; and
generating a virtual machine configuration file that comprises a physical address of a corresponding one of the plurality of physical GPUs and a platform specific profile for the vGPU.

5. The system of claim 1, wherein the virtual machine is one of a plurality of virtual machines (VMs) executing in a computing environment; and
further comprising program instructions executable in the at least one computing device that, when executed by the at least one computing device, cause the at least one computing device to, in response to a delete request or an optimization requested being identified, reassign at least one of the plurality of VMs to another host based at in part on an order in which the plurality of VMs were created.

6. The system of claim 1, further comprising program instructions executable in the at least one computing device that, when executed by the at least one computing device, cause the at least one computing device to:
identify another configuration of another virtual machine that does not specify a preferred graphics card; and
identify another one of the plurality of hosts to place the another virtual machine based at least in part on a priority determined for each of the plurality of hosts.

7. The system of claim 6, the priority is determined using a first-fit mode or a best-fit mode of assignment.

8. A non-transitory computer-readable medium embodying program code executable in at least one computing device that, when executed by the at least one computing device, causes the at least one computing device to:
identify a configuration of a virtual machine that indicates that a virtual graphics processing unit (vGPU) is to be utilized in an execution of the virtual machine, the configuration comprising a graphics computing requirement comprising a preferred graphics card for the virtual machine, wherein the configuration is platform independent;
identify a plurality of hosts available in a computing environment to place the virtual machine, wherein each of the plurality of hosts comprises at least one of a plurality of physical graphics processing units (GPUs); and identify one of the plurality of hosts to place the virtual machine based at least in part on the graphics computing requirement, the one of the plurality of hosts being identified based at least in part on and identification of an available one of the plurality of hosts comprising the preferred graphics card having a highest host load.

9. The non-transitory computer-readable medium of claim 8, wherein the graphics computing requirement further comprises at least one of: a video memory requirement, a central processing unit (CPU) requirement, and a random-access memory (RAM) requirement.

10. The non-transitory computer-readable medium of claim 9, wherein the virtual machine is associated with a virtual machine template.

11. The non-transitory computer-readable medium of claim 8, further comprising program code executable in the at least one computing device that, when executed by the at least one computing device, causes the at least one computing device to:

place the virtual machine on the available one of the plurality of hosts comprising the preferred graphics card and having the highest host load by:
cloning a template virtual machine to the available one of the plurality of hosts; and
generating a virtual machine configuration file that comprises a physical address of a corresponding one of the plurality of physical GPUs and a platform specific profile for the vGPU.

12. The non-transitory computer-readable medium of claim 8, wherein the virtual machine is one of a plurality of virtual machines (VMs) executing in a computing environment; and further comprising program code executable in the at least one computing device that, when executed by the at least one computing device, causes the at least one computing device to, in response to a delete request or an optimization requested being identified, reassign at least one of the plurality of VMs to another host based at in part on an order in which the plurality of VMs were created.

13. The non-transitory computer-readable medium of claim 8, further comprising program instructions executable in the at least one computing device that, when executed by the at least one computing device, cause the at least one computing device to:

identify another configuration of another virtual machine that does not specify a preferred graphics card; and
identify another one of the plurality of hosts to place the another virtual machine based at least in part on a priority determined for each of the plurality of hosts.

14. The non-transitory computer-readable medium of claim 13, the priority is determined using a first-fit mode of assignment or a best-fit mode of assignment.

15. A method, comprising:
identifying a configuration of a virtual machine that indicates that a virtual graphics processing unit (vGPU) is to be utilized in an execution of the virtual machine, the configuration comprising a graphics computing requirement comprising a preferred graphics card for the virtual machine, wherein the configuration is platform independent;
identifying a plurality of hosts available in a computing environment to place the virtual machine, wherein each of the plurality of hosts comprises at least one of a plurality of physical graphics processing units (GPUs); and
identifying one of the plurality of hosts to place the virtual machine based at least in part on the graphics computing requirement, the one of the plurality of hosts being identified based at least in part on and identification of an available one of the plurality of hosts comprising the preferred graphics card having a highest host load.

16. The method of claim 15, wherein the graphics computing requirement further comprises at least one of: a video memory requirement, a central processing unit (CPU) requirement, and a random-access memory (RAM) requirement.

17. The method of claim 16, wherein the virtual machine is associated with a virtual machine template.

18. The method of claim 15, further comprising placing the virtual machine on the available one of the plurality of hosts comprising the preferred graphics card and having the highest host load by:
cloning a template virtual machine to the available one of the plurality of hosts; and
generating a virtual machine configuration file that comprises a physical address of a corresponding one of the plurality of physical GPUs and a platform specific profile for the vGPU.

19. The method of claim 15, wherein the virtual machine is one of a plurality of virtual machines (VMs) executing in a computing environment; and
further comprising, in response to a delete request or an optimization requested being identified, reassigning at least one of the plurality of VMs to another host based at in part on an order in which the plurality of VMs were created.

20. The method of claim 15, further comprising:
identifying another configuration of another virtual machine that does not specify a preferred graphics card; and
identifying another one of the plurality of hosts to place the another virtual machine based at least in part on a priority determined for each of the plurality of hosts.

* * * * *